(12) United States Patent
Sobanski et al.

(10) Patent No.: US 11,415,006 B2
(45) Date of Patent: Aug. 16, 2022

(54) CMC VANE WITH SUPPORT SPAR AND BAFFLE

(71) Applicant: Raytheon Technologies Corporation, Farmington, CT (US)

(72) Inventors: Jon E. Sobanski, Glastonbury, CT (US); Tyler G. Vincent, Portland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 9 days.

(21) Appl. No.: 17/023,471

(22) Filed: Sep. 17, 2020

(65) Prior Publication Data

US 2022/0082024 A1 Mar. 17, 2022

(51) Int. Cl.
*F01D 9/02* (2006.01)
*F02C 3/04* (2006.01)

(52) U.S. Cl.
CPC .............. *F01D 9/02* (2013.01); *F02C 3/04* (2013.01); *F05D 2220/32* (2013.01); *F05D 2240/126* (2013.01); *F05D 2300/6033* (2013.01)

(58) Field of Classification Search
CPC ... F01D 9/02; F01D 9/04; F01D 5/188; F01D 5/189; F01D 5/18; F05D 2240/126; F05D 2240/12; F05D 2300/6033; F05D 2260/201; F02C 3/04
See application file for complete search history.

(56) References Cited

U.S. PATENT DOCUMENTS 5,253,976 A * 10/1993 Cunha ................. F01D 5/182
  415/114
8,511,969 B2 * 8/2013 Durocher ............ F01D 25/28
  415/115

(Continued)

FOREIGN PATENT DOCUMENTS

EP        3323985      5/2018
EP        3597865      1/2020
WO     2017039607      3/2017

OTHER PUBLICATIONS

Partial European Search Report for European Patent Application No. 21197522.2 dated May 17, 2022.

*Primary Examiner* — Eldon T Brockman
*Assistant Examiner* — Danielle M. Christensen
(74) *Attorney, Agent, or Firm* — Carlson, Gaskey & Olds, P.C.

(57) ABSTRACT

A vane includes a ceramic airfoil section that has an airfoil wall defining a leading edge, a trailing edge, a pressure side, and a suction side. The ceramic airfoil section has an internal cavity. A support spar extends through the internal cavity for supporting the ceramic airfoil section. The support spar is spaced from the airfoil wall such that there is a gap there between. The support spar has an internal through-passage that is fluidly isolated from the gap in the ceramic airfoil section. A baffle is disposed in the gap and is spaced apart from the airfoil wall and the support spar so as to divide the gap into a plenum space between the support spar and the baffle and an impingement space between the baffle and the airfoil wall. The baffle has impingement holes directed toward the airfoil wall that connect the plenum space and the impingement space.

20 Claims, 2 Drawing Sheets

(56) References Cited

U.S. PATENT DOCUMENTS

| | | | | |
|---|---|---|---|---|
| 8,777,569 | B1* | 7/2014 | Liang | F01D 5/188 |
| | | | | 416/96 A |
| 9,915,151 | B2 | 3/2018 | Weaver et al. | |
| 10,309,240 | B2 | 6/2019 | Heitman et al. | |
| 10,711,621 | B1 | 7/2020 | Whittle | |
| 2001/0018019 | A1* | 8/2001 | Jang | F01D 5/189 |
| | | | | 415/115 |
| 2010/0068034 | A1 | 3/2010 | Schiavo et al. | |
| 2012/0266439 | A1* | 10/2012 | Geiger | B22F 5/009 |
| | | | | 29/428 |
| 2018/0135459 | A1* | 5/2018 | Propheter-Hinckley | |
| | | | | F04D 29/582 |
| 2019/0234236 | A1 | 8/2019 | Spangler et al. | |
| 2019/0323362 | A1 | 10/2019 | Arisi et al. | |
| 2021/0140326 | A1* | 5/2021 | White, III | F01D 5/189 |
| 2021/0231022 | A1* | 7/2021 | Whittle | F01D 5/188 |

\* cited by examiner

CMC VANE WITH SUPPORT SPAR AND BAFFLE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A vane for a gas turbine engine according to an example of the present disclosure includes a ceramic airfoil section having an airfoil wall that defines a leading edge, a trailing edge, a pressure side, and a suction side. The ceramic airfoil section has an internal cavity, and there is a support spar extending through the internal cavity for supporting the ceramic airfoil section. The support spar is spaced from the airfoil wall such that there is a gap there between. The support spar has an internal through-passage that is fluidly isolated from the gap in the ceramic airfoil section. A baffle disposed in the gap is spaced apart from the airfoil wall and the support spar so as to divide the gap into a plenum space between the support spar and the baffle and an impingement space between the baffle and the airfoil wall. The baffle has impingement holes directed toward the airfoil wall and connecting the plenum space and the impingement space.

In a further embodiment of any of the foregoing embodiments, the baffle circumscribes the structural spar.

In a further embodiment of any of the foregoing embodiments, the baffle defines first and second ends, and the second end is sealed with the structural spar and is sealed with the airfoil wall such that the impingement holes are an exclusive exit from the plenum space.

In a further embodiment of any of the foregoing embodiments, the baffle is sealed with the airfoil wall by a seal member and is sealed with the structural spar by a weld joint.

In a further embodiment of any of the foregoing embodiments, the baffle is formed of sheet metal.

In a further embodiment of any of the foregoing embodiments, the baffle is mounted on a spring member.

In a further embodiment of any of the foregoing embodiments, the support spar is formed of a single-crystal metal alloy.

In a further embodiment of any of the foregoing embodiments, the impingement holes are directed toward the leading edge.

In a further embodiment of any of the foregoing embodiments, the airfoil section includes a rib that divides the internal cavity into a forward cavity that is bounded by the leading edge and an aft cavity that is bounded by the trailing edge, and the support spar and the baffle are disposed in the forward cavity.

In a further embodiment of any of the foregoing embodiments, the internal through-passage conveys first pressurized air through the ceramic airfoil section, and the plenum space conveys second, different pressurized air that discharges through the impingement holes onto the airfoil wall.

A vane for a gas turbine engine according to an example of the present disclosure includes a ceramic airfoil section that has an airfoil wall that defines a leading edge, a trailing edge, a pressure side, and a suction side. The ceramic airfoil section has an internal cavity bounded at least by the leading edge. A support spar extends through the internal cavity for supporting the ceramic airfoil section. The support spar is spaced from leading edge such that there is a gap there between. The support spar has an internal through-passage that is fluidly isolated from the gap in the ceramic airfoil section. The internal through-passage conveys first pressurized air through the ceramic airfoil section. A baffle disposed in the gap is spaced apart from the airfoil wall and the support spar so as to divide the gap into a plenum space between the support spar and the baffle and an impingement space between the baffle and the airfoil wall. The baffle has impingement holes directed toward the leading edge of the airfoil wall and connecting the plenum space and the impingement space. The plenum space conveys second, different pressurized air that discharges through the impingement holes onto the leading edge of the airfoil wall.

In a further embodiment of any of the foregoing embodiments, the first pressurized air and the second pressurized air differ in Mach number.

In a further embodiment of any of the foregoing embodiments, the Mach number of the first pressurized air is greater than the Mach number of the second pressurized air.

In a further embodiment of any of the foregoing embodiments, the baffle circumscribes the structural spar.

In a further embodiment of any of the foregoing embodiments, the baffle defines first and second ends, and the second end is sealed with the structural spar and is sealed with the airfoil wall such that the impingement holes are an exclusive exit from the plenum space.

In a further embodiment of any of the foregoing embodiments, the baffle is sealed with the airfoil wall by a seal member and is sealed with the structural spar by a weld joint.

In a further embodiment of any of the foregoing embodiments, the support spar is formed of a single-crystal metal alloy.

In a further embodiment of any of the foregoing embodiments, the baffle is formed of sheet metal.

In a further embodiment of any of the foregoing embodiments, the baffle is mounted on a spring member.

A gas turbine engine according to an example of the present disclosure includes a compressor section, a combustor in fluid communication with the compressor section, and a turbine section in fluid communication with the combustor. The turbine section has a vane as in any of the foregoing embodiments.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
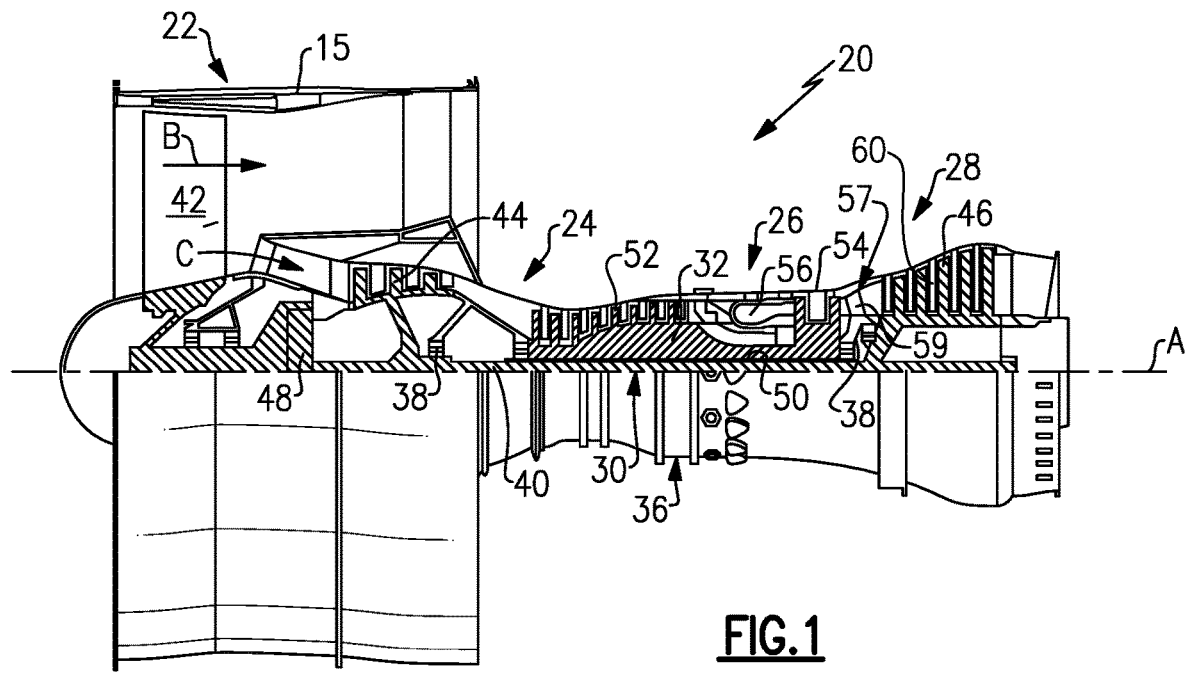
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 meters/second).

Figure 2:
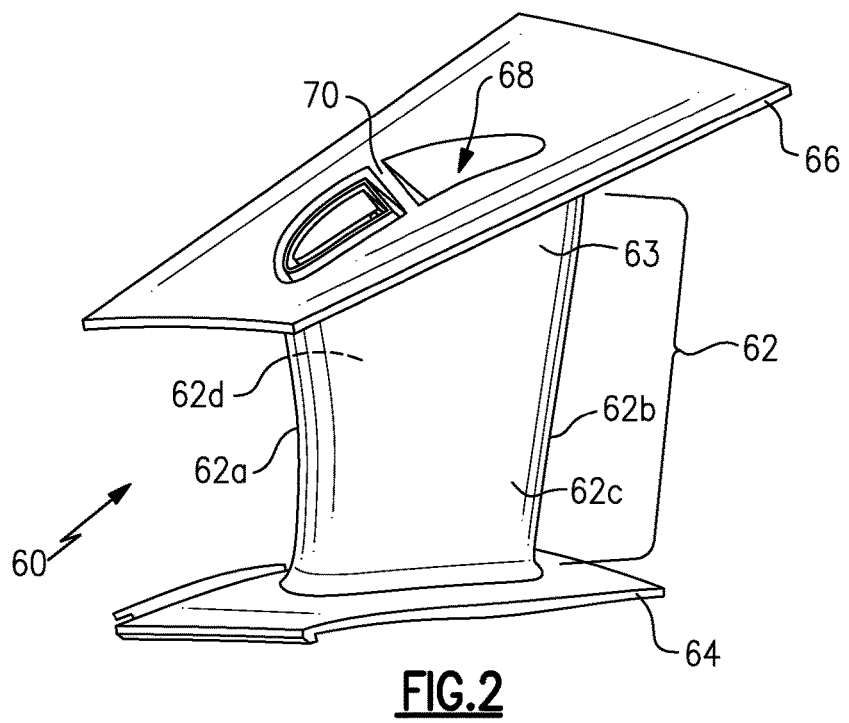
FIG. 2 illustrates a vane from the engine.

FIG. 2 illustrates a representative example of a vane 60 from the turbine section 28 of the engine 20 (see also FIG. 1). The vane 60 includes a ceramic airfoil section 62 that is formed by an airfoil wall 63. The airfoil wall 63 defines a leading edge 62a, a trailing edge 62b, and first and second sides 62c/62d that join the leading edge 62a and the trailing edge 62b. In this example, the first side 62c is a pressure side and the second side 62d is a suction side. The ceramic airfoil section 62 generally extends in a radial direction relative to the central engine axis and spans from a first end at an inner platform 64 to a second end at an outer platform 66. The terms "inner" and "outer" refer to location with respect to the central engine axis A, i.e., radially inner or radially outer.

As the nomenclature indicates, the ceramic airfoil section 62 is formed of a ceramic material. In the illustrated example, the airfoil section 62 is integrally formed with the platforms 64/66, which are thus formed of the same ceramic material. For example, the ceramic material is a monolithic ceramic, a ceramic matrix composite ("CMC"), or a combination thereof. CMCs are comprised of a ceramic reinforcement, which is usually ceramic fibers, in a ceramic matrix. A monolithic ceramic does not contain reinforcement and may be a solid poly- or mono-crystalline ceramic. Example monolithic ceramics are, but are not limited to, silicon-containing monolithic ceramics. Example silicon-containing monolithic ceramics are, but are not limited to, silicon carbide (SiC) monolithic ceramic or silicon nitride ($Si_3N_4$) monolithic ceramic. Example ceramic matrices of the CMC are silicon-containing ceramics, such as but not limited to, a silicon carbide (SiC) matrix or silicon nitride ($Si_3N_4$) matrix. Example ceramic reinforcement of the CMC are silicon-containing ceramic fibers, such as but not limited to, silicon carbide (SiC) fibers or silicon nitride ($Si_3N_4$) fibers.

The ceramic airfoil section 62 circumscribes an interior through-cavity 68. The ceramic airfoil section may have a single through-cavity 68 or, as shown, the ceramic airfoil section 62 may include a rib 70 that that divides the interior through-cavity 68 into a forward cavity that is bound by the leading edge 62a portion of the airfoil wall 63 and an aft cavity that is bound by the trailing edge 62b portion of the airfoil wall 63.

Figure 3:
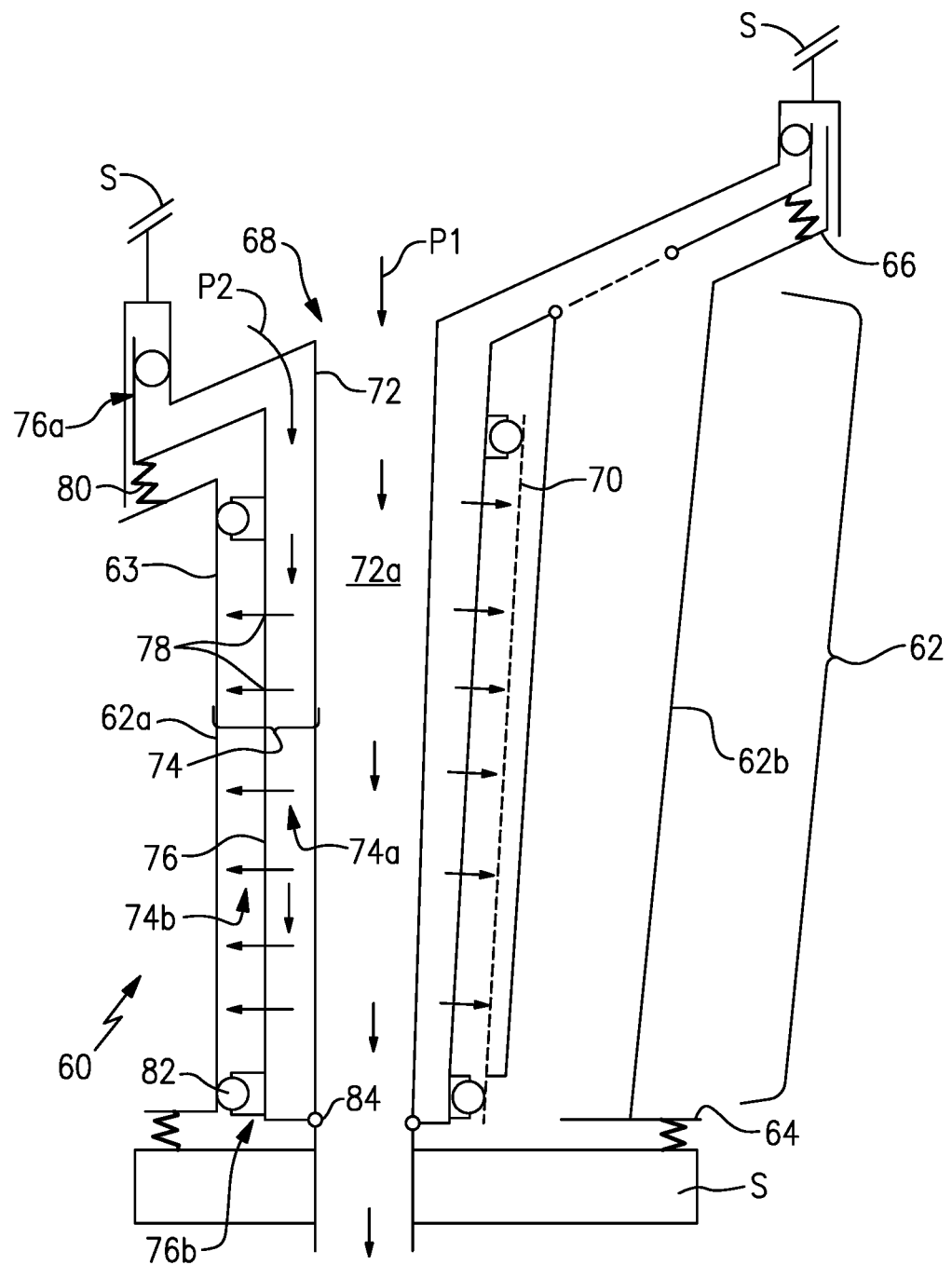
FIG. 3 illustrates a representative sectioned view of the vane.

FIG. 3 shows a representative sectioned view of the vane 60 taken in the plane of the chord of the ceramic airfoil section 62. The vane 60 further includes a support spar 72 that extends through the internal cavity 68 and mechanically supports the ceramic airfoil section 62. In this example, the support spar 72 extends through the forward cavity defined by the rib 70 and the leading edge 62a portion of the airfoil wall 63. The support spar 72 is generally radially elongated and is secured with structural supports, indicated at S, at its radially inner and outer ends. The support spar 72 serves to mechanically support the ceramic airfoil section 62 and react out loads, such as aerodynamic loads. In this regard, the support spar 72 is formed of a relatively high temperature strength material, such as a single crystal metal alloy (e.g., a single crystal nickel- or cobalt-alloy).

The support spar 72 is spaced from the airfoil wall 63 such that there is a gap 74 there between. The support spar 72 bounds an internal through-passage 72a, the function of which will be described later below. The walls of the support spar 72 are solid and continuous such that the through-passage 72a is fluidly isolated from the gap 74 at least in the ceramic airfoil section 62. For instance, within the spatial envelope of the vane 60, including the ceramic airfoil section and platforms 64/66, the support spar 72 excludes any holes or passages that fluidly connect the through-passage 72a with the gap 74.

The vane 60 also includes a baffle 76 that is disposed in the gap 74. The baffle 76 generally circumscribes the support spar 72. The baffle 76 is spaced apart from the airfoil wall 63 and the support spar 72 so as to divide the gap 74 into a plenum space 74a between the support spar 72 and the baffle 76 and an impingement space 74b between the baffle 76 and the airfoil wall 63. The baffle 76 has impingement holes, represented at 78 with the depicted flow arrows. The impingement holes 78 are directed toward the airfoil wall 63 and connect the plenum space 74a and the impingement space 74b. In this example, the impingement holes 78 are directed toward the leading edge 62a. The baffle 76 is formed of sheet metal but may alternatively be formed from an alloy using additive manufacturing. Sheet metal is relatively inexpensive, can be readily drilled to provide holes, and can be bent to the desired geometry.

The baffle 76 may generally follow the contours of the support spar 72 such that the plenum space 74a is of substantially uniform thickness around the support spar 72. It is to be understood, however, that the geometry of the support spar 72, baffle 76, plenum space 74a, and impingement space 74b may be varied in accordance with desired flow and cooling requirements. For instance, the baffle may additionally or alternatively follow the contours of the airfoil wall 63 such that the impingement space 74b is of substantially uniform thickness.

In the illustrated example, the baffle 76 is mounted on one or more spring members 80. The spring members 80 serve to position the baffle 76, yet are compliant in order to accommodate differences in thermal growth between the baffle 76 and the ceramic airfoil section 62. For example, the spring members 80 may be spring seals that additionally serve to seal the impingement space 74b. Additionally or alternatively, the baffle 76 may be fixed, e.g., by welding, to the support spar 72 to facilitate maintaining the thickness of the plenum space 74a as the components thermally expand and contract.

Like the support spar 72, the baffle 76 is generally radially elongated. However, unlike the support spar 72, the baffle 76 does not extend through the airfoil section 62 to the structural supports (S). Rather, the baffle 76 defines first and second ends 76a/76b, and the second end 76b is sealed with the support spar 72 and the airfoil wall 63. In this regard, the impingement holes 78 are the exclusive exit from the plenum space 74a into the impingement space 74b. In the illustrated example, the baffle 76 is sealed with the airfoil wall 63 by a seal member 82, such as a rope or spring seal, and is sealed with the support spar 72 by a weld joint 84. Additional seal members 82 may be provided near the first end 76a.

Cooling air, such as bleed air from the compressor section 24, is conveyed into and through the through-passage 72a. This cooling air is destined for a downstream cooling location, such as a tangential onboard injector (TOBI). As indicated above, the through-passage 72a is isolated from the gap 74. Thus, the cooling air in the through-passage 72a does not intermix with cooling air in the gap 74. Furthermore, the baffle 76, which is located between the airfoil wall 63 and the support spar 72, facilitates shielding the support spar 72 from thermal radiation emitted by the hot airfoil wall 63. The baffle 78 thus helps to reduce thermal pick-up by the cooling air as it passes through the support spar 72 and may thereby enhance cooling efficiency at the downstream location. Additionally, if the airfoil wall 63 experiences damage, such as burn-through, the baffle 76 may serve to thermally shield the structural support spar 72 from hot gases.

Cooling air is also conveyed into the plenum space 74a. As the only exit from the plenum space 74a is through the impingement holes 78, all of the cooling air in the plenum space 74a is emitted as impingement cooling onto the airfoil wall 63. For example, the impingement holes 78 are directed toward the leading edge 62a. Alternatively or additionally, the cooling holes 78 may be directed toward the pressure side 62c and/or suction side 62d.

The cooling air conveyed to the plenum space 74a, however, is different than the cooling air provided to the through-passage 72a of the support spar 72. For instance, the internal through-passage 72a is provided with first pressurized air P1 and the plenum space 74a is provided with different, second pressurized air P2. The pressurized air P1 and P2 differ in Mach number and thus also in pressure. For instance, the Mach number of the pressurized air P1 is greater than the Mach number of the pressurized air P2. As an example, P1 is greater than P2 by a factor of 2-3. At the expected Mach number of the pressurized air P1, the air in the through-passage 72a is of insufficient pressure for impingement cooling. The pressurized air P1 and P2 can come from the different sources (e.g., bleed air from different compressor stages) or the same source (same bleed air) that is divided into streams for P1 and P2 but that vary in pressure due to flow/exit paths.

In general, a leading edge of a turbine vane needs to be cooled. This is challenging in a two-cavity design with a forward spar that carries cooling air that is insufficient for impingement cooling. However, by isolating the through-passage 72a from the gap 74 and providing separate cooling air to the plenum space 74a, the leading edge 62a portion of the airfoil wall 63 is provided with cooling, while maintaining the ability of the through-passage to convey cooling air for downstream use.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane for a gas turbine engine, comprising:
   a ceramic airfoil section having an airfoil wall defining a leading edge, a trailing edge, a pressure side, and a suction side, the ceramic airfoil section having an internal cavity;
   a support spar extending through the internal cavity for supporting the ceramic airfoil section, the support spar being spaced from the airfoil wall such that there is a gap there between, the support spar having an internal through-passage that is fluidly isolated from the gap in the ceramic airfoil section; and
   a baffle disposed in the gap, the baffle being spaced apart from the airfoil wall and the support spar so as to divide the gap into a plenum space between the support spar and the baffle and an impingement space between the baffle and the airfoil wall, the baffle having impingement holes directed toward the airfoil wall and connecting the plenum space and the impingement space.

2. The vane as recited in claim 1, wherein the baffle circumscribes the support spar.

3. The vane as recited in claim 1, wherein the baffle defines first and second ends, and the second end is sealed with the support spar and is sealed with the airfoil wall such that the impingement holes are an exclusive exit from the plenum space.

4. The vane as recited in claim 3, wherein the baffle is sealed with the airfoil wall by a seal member and is sealed with the support spar by a weld joint.

5. The vane as recited in claim 1, wherein the baffle is formed of sheet metal.

6. The vane as recited in claim 1, wherein the baffle is mounted on a spring member.

7. The vane as recited in claim 1, wherein the support spar is formed of a single-crystal metal alloy.

8. The vane as recited in claim 1, wherein the impingement holes are directed toward the leading edge.

9. The vane as recited in claim 1, wherein the airfoil section includes a rib that divides the internal cavity into a forward cavity that is bounded by the leading edge and an aft cavity that is bounded by the trailing edge, and the support spar and the baffle are disposed in the forward cavity.

10. The vane as recited in claim 1, wherein the internal through-passage conveys first pressurized air through the ceramic airfoil section, and the plenum space conveys second, different pressurized air that discharges through the impingement holes onto the airfoil wall.

11. A vane for a gas turbine engine, comprising:
    a ceramic airfoil section having an airfoil wall defining a leading edge, a trailing edge, a pressure side, and a suction side, the ceramic airfoil section having an internal cavity bounded at least by the leading edge;
    a support spar extending through the internal cavity for supporting the ceramic airfoil section, the support spar being spaced from leading edge such that there is a gap there between, the support spar having an internal through-passage that is fluidly isolated from the gap in the ceramic airfoil section, the internal through-passage conveying first pressurized air through the ceramic airfoil section; and
    a baffle disposed in the gap, the baffle being spaced apart from the airfoil wall and the support spar so as to divide the gap into a plenum space between the support spar and the baffle and an impingement space between the baffle and the airfoil wall, the baffle having impingement holes directed toward the leading edge of the airfoil wall and connecting the plenum space and the impingement space, the plenum space conveying second, different pressurized air that discharges through the impingement holes onto the leading edge of the airfoil wall.

12. The vane as recited in claim 11, wherein the first pressurized air and the second pressurized air differ in Mach number.

13. The vane as recited in claim 11, wherein the Mach number of the first pressurized air is greater than the Mach number of the second pressurized air.

14. The vane as recited in claim 11, wherein the baffle circumscribes the support spar.

15. The vane as recited in claim 14, wherein the baffle defines first and second ends, and the second end is sealed with the support spar and is sealed with the airfoil wall such that the impingement holes are an exclusive exit from the plenum space.

16. The vane as recited in claim 15, wherein the baffle is sealed with the airfoil wall by a seal member and is sealed with the support spar by a weld joint.

17. The vane as recited in claim 16, wherein the support spar is formed of a single-crystal metal alloy.

18. The vane as recited in claim 17, wherein the baffle is formed of sheet metal.

19. The vane as recited in claim 18, wherein the baffle is mounted on a spring member.

20. A gas turbine engine comprising:
    a compressor section;
    a combustor in fluid communication with the compressor section; and
    a turbine section in fluid communication with the combustor, the turbine section having a vane that includes:
      a ceramic airfoil section having an airfoil wall defining a leading edge, a trailing edge, a pressure side, and a suction side, the ceramic airfoil section having an internal cavity,
      a support spar extending through the internal cavity for supporting the ceramic airfoil section, the support spar being spaced from the airfoil wall such that there is a gap there between, the support spar having an internal through-passage that is fluidly isolated from the gap in the ceramic airfoil section, and
      a baffle disposed in the gap, the baffle being spaced apart from the airfoil wall and the support spar so as to divide the gap into a plenum space between the support spar and the baffle and an impingement space between the baffle and the airfoil wall, the baffle having impingement holes directed toward the airfoil wall and connecting the plenum space and the impingement space.

* * * * *